United States Patent
Dawkins et al.

(10) Patent No.: US 6,487,638 B2
(45) Date of Patent: Nov. 26, 2002

(54) SYSTEM AND METHOD FOR TIME WEIGHTED ACCESS FREQUENCY BASED CACHING FOR MEMORY CONTROLLERS

(75) Inventors: William Price Dawkins, Round Rock, TX (US); Karl David Schubert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 97 days.

(21) Appl. No.: 09/770,146

(22) Filed: Jan. 26, 2001

(65) Prior Publication Data

US 2002/0103975 A1 Aug. 1, 2002

(51) Int. Cl.$^7$ ................................. C06F 12/00
(52) U.S. Cl. ..................... 711/133; 711/3; 711/113; 711/118; 711/133; 711/136; 711/141; 711/145; 711/146; 711/172; 714/6
(58) Field of Search ............... 711/3, 113, 118, 711/133, 136, 141, 145–146, 172; 714/6

(56) References Cited

U.S. PATENT DOCUMENTS

| | | | | |
|---|---|---|---|---|
| 5,276,832 A | * | 1/1994 | Holman, Jr. ................. 711/3 |
| 5,325,508 A | * | 6/1994 | Parks et al. ................ 711/118 |
| 5,452,440 A | * | 9/1995 | Salsburg .................... 711/136 |
| 5,511,180 A | * | 4/1996 | Schieve .................... 711/172 |
| 5,555,395 A | * | 9/1996 | Parks ........................ 711/145 |
| 5,572,660 A | * | 11/1996 | Jones ........................... 714/6 |
| 5,623,633 A | * | 4/1997 | Zeller et al. ............... 711/146 |
| 5,623,700 A | * | 4/1997 | Parks et al. ................. 710/53 |
| 5,632,038 A | * | 5/1997 | Fuller ....................... 713/324 |
| 5,717,894 A | * | 2/1998 | Vivio ........................ 710/35 |
| 5,761,725 A | * | 6/1998 | Zeller et al. ............... 711/146 |
| 5,890,213 A | * | 3/1999 | Sokolov .................... 711/113 |
| 5,896,493 A | * | 4/1999 | Rao ........................... 714/6 |
| 5,903,911 A | * | 5/1999 | Gaskins .................... 711/141 |
| 5,974,497 A | * | 10/1999 | Teshome ................... 710/129 |
| 6,094,706 A | * | 7/2000 | Factor et al. .............. 711/113 |
| 6,145,056 A | * | 11/2000 | Heydon et al. |
| 6,212,631 B1 | | 4/2001 | Springer et al. ............... 713/1 |

* cited by examiner

*Primary Examiner*—Do Hyun Yoo
*Assistant Examiner*—Mehdi Namazi
(74) *Attorney, Agent, or Firm*—Baker Botts L.L.P.

(57) ABSTRACT

A system and method for replacing cached data for a computer system utilizing one or more storage devices is disclosed. The storage devices are divided into a plurality of areas or bins. Each bin is preferably the same size. A Bin Access Table (BAT) is an array stored in memory that contains a frequency value for each bin corresponding to the number of times that the bin has been accessed during a predetermined time period. The BAT also contains a time stamp for each bin corresponding to the time that the bin was last accessed. A hot spot algorithm is used to calculate a hot spot factor or value hsf(x) for each bin based on its associated frequency value listed in the BAT. The frequency values may be weighted based on the time the bin was last accessed. Each line in cache will therefore correspond to a specific bin for which a time weighted hotspot factor hsf(x) has been calculated. These time weighted hot spot values are be stored in a hot spot table. When data is retrieved from a storage in response to a cache miss, a memory controller, such as a processor or RAID controller, will compare the hotspot factor hsf(a) of the bin associated with the new data to the lowest time weighted hotspot factor hsf(z) in the hot spot table. If the time weighted hsf(z) is greater than hsf(a), then this indicates that bin (z), the bin with the lowest time weighted hotspot factor, is accessed more frequently than bin (a), the bin containing the retrieved data. Thus if the time weighted hsf(z) is greater than hsf(a), then the cache line containing data from bin (z) will not be replaced. If hsf(a) is greater than the time weighted hsf(z) then the new data will replace the cached data from bin (z). The BAT table is updated after the I/O access.

37 Claims, 6 Drawing Sheets

| INDEX | ACCESS FREQUENCY | TIME OF LAST ACCESS |
|---|---|---|
| BIN 0 | $f_0$ | $t_0$ |
| BIN 1 | $f_1$ | $t_1$ |
| BIN 2 | $f_2$ | $t_2$ |
| ⋮ | ⋮ | ⋮ |
| BIN n | $f_n$ | $t_n$ |

FIG.4

| | ACCESS FREQUENCY | TIME STAMP |
|---|---|---|
| BIN 0 | 10 | 20 |
| BIN 1 | 20 | 25 |
| BIN 2 | 5 | 10 |

TIME t=29

FIG.5a

| | ACCESS FREQUENCY | TIME STAMP |
|---|---|---|
| BIN 0 | 11 | 30 |
| BIN 1 | 20 | 25 |
| BIN 2 | 5 | 10 |

TIME t=30

FIG.5b

SYSTEM AND METHOD FOR TIME WEIGHTED ACCESS FREQUENCY BASED CACHING FOR MEMORY CONTROLLERS

CROSS-REFERENCE TO RELATED APPLICATION

This application is related to U.S. application titled "System and Method for Time Window Frequency Based Caching for Memory Controllers" by Williams Dawkins et al., which is filed concurrently herewith and which is incorporated herein by reference in its entirety for all purposes.

TECHNICAL FIELD

The present disclosure relates in general to the field of computer systems, and, more particularly, to a system and method for caching data retrieved from one or more storage devices.

BACKGROUND

Computer networking environments such as Local Area Networks (LANs) and Wide Area Networks (WANs) permit many users, often at remote locations, to share communication, data, and resources. A storage area network (SAN) may be used to provide centralized data sharing, data backup, and storage management in these networked computer environments. A SAN is a high-speed subnetwork of shared storage devices. The combination of a LAN or WAN with a SAN may be referred to as a shared storage network. A storage device is any device that principally contains a single disk or multiple disks for storing data for a computer system or computer network. Because these storage devices are intended to serve several servers, these storage devices are typically capable of storing much more data than the hard drive of a desktop computer. The collection of storage devices is sometimes referred to as a storage pool. The storage devices in a SAN can be collocated, which allows for easier maintenance and easier expandability of the storage pool. The network architecture of most SANs is such that all of the storage devices in the storage pool are available to all the servers on the LAN or WAN that is coupled to the SAN. Additional storage devices can be easily added to the storage pool, and these new storage devices will also be accessible from any server in the larger network.

In a computer network that includes a SAN, the server can act as a pathway or transfer agent between the end user and the stored data. Because much of the stored data of the computer network resides in the SAN, rather than in the servers of the network, the processing power of the servers can be used for applications. Network servers can access a SAN using the Fiber Channel protocol, taking advantage of the ability of a Fiber Channel fabric to serve as a common physical layer for the transport of multiple upper layer protocols, such as SCSI, IP, and HIPPI, among other examples.

The storage devices in a SAN may be structured in a redundant array of independent disks (RAID) configuration. When a system administrator configures a shared data storage pool into a SAN, each storage device may be grouped together into one or more RAID volumes and each volume is assigned a SCSI logical unit number (LUN) address. If the storage devices are not grouped into RAID volumes, each storage device will typically be assigned its own LUN. The system administrator or the operating system for the network will assign a volume or storage device and its corresponding LUN to each server of the computer network. Each server will then have, from a memory management standpoint, logical ownership of a particular LUN and will store the data generated from that server in the volume or storage device corresponding to the LUN owned by the server.

A RAID controller board is the hardware element that serves as the backbone for the array of disks. The RAID controller relays the input/output (I/O) commands or read/write requests to specific storage devices in the array. The RAID controller provides the physical link to each of the storage devices so that the disks may be easily removed or replaced. In order to provide greater fault tolerance, the RAID controller also serves to monitor the integrity of each storage device in the array to anticipate the need to move data in the event of a faulty or failing disk drive.

RAID controllers may also cache data retrieved from the storage devices. RAID controller support for caching may improve the I/O performance of the disk subsystems of the SAN. RAID controllers generally use read caching, read-ahead caching or write caching, depending on the application programs used within the array. For a system using read-ahead caching, data specified by a read request is read, along with a portion of the succeeding or sequentially related data on the drive. This succeeding data is stored in cache memory on the RAID controller. If a subsequent read request uses the cached data, access to the drive is avoided and the data is retrieved at the speed of the system I/O bus. Read-ahead caching is ideal for applications that store data in large sequential records, such as video image processing. However, read-ahead caching is ill-suited for random-access applications, such as transactional or database applications. In random-access applications, read requests are usually not sequentially related to previous read requests. As a result, if most of the SAN storage applications are random-access applications, the data read for caching purposes rarely results in a cache hit.

RAID controllers may also use write caching. Write-through caching and write-back caching are two distinct types of write caching. For systems using write-through caching, the RAID controller does not acknowledge the completion of the write operation until the data is written to the drive. In contrast, write-back caching does not copy modifications to data in the cache to the cache source until absolutely necessary. The RAID controller signals that the write request is complete after the data is stored in the cache but before it is written to the drive. The caching method improves performance relative to write-through caching because the application program can resume while the data is being written to the drive. However, there is a risk associated with this caching method because if system power is interrupted, any information in the cache is lost.

To improve cache hit rates on random access workloads, RAID controllers typically use cache algorithms developed for processors, such as those used in desktop computers. Processor cache algorithms generally rely on the locality of reference of their applications and data to realize performance improvements. As data or program information is accessed by the computer system, this data is stored in cache in the hope that the information will be accessed again in a relatively short time. Once the cache is full, an algorithm is used to determine what data in cache should be replaced when new data that is not in cache is accessed. Generally, a least recently used (LRU) algorithm is used to make this determination. Because processor activities normally have a high degree of locality of reference, this algorithm works well for these applications. It is not unusual to observe processor cache hit rates of 90% or greater.

However, secondary storage I/O activity rarely exhibits the degree of locality for accesses to processor memory. The effectiveness of processor based caching algorithms can be very low for RAID controllers. The use of a RAID controller cache that uses processor based caching algorithms may actually degrade performance in random access applications due to the processing overhead incurred by caching data that will not be accessed from the cache before being replaced. As a result, conventional caching methods are not effective for storage applications. Some storage subsystems vendors increase the size of the cache in order to improve the cache hit rate. However, given the associated size of the SAN storage devices, increasing the size of the cache may not significantly improve cache hit rates. For example, in the case where 64 MB cache is connected to twelve 32 GB drives, the cache is only 0.0175% the size of the associated storage. Even if the cache size is doubled, increasing the cache size will not significantly increase the hit ratio because the locality of reference for these systems is low.

As discussed above, many I/O access patterns for disk subsystems exhibit low levels of locality. However, while many applications exhibit what may be characterized as random I/O access patterns, very few applications truly have completely random access patterns. The majority of data most applications access are related and, as a result, certain areas of storage are accessed with relatively more frequency than other areas. The areas of storage that are more frequently accessed than other areas may be called "hot spots." FIG. 1 shows I/O access patterns as a function of disk address and time. For purposes of illustration, the disk is divided into five sections of disk addresses. When viewed for only a short period of time, from time to $t_0$ $t_1$ for example, I/O accesses 32 are basically random and do not exhibit a pattern that may be exploited for caching purposes. However, when viewed over a period of time, one may observe that I/O access patterns are more dense in certain areas of storage than other areas. In this case, I/O access patterns occur more frequently in the zone 34 corresponding to disk address section 1 during the time period of time to $t_0$ $t_6$. Thus, section 1 may be considered a hot spot during this time period because data is being accessed more frequently in this area of storage in comparison to other areas. For example, index tables in database applications are generally more frequently accessed than the data store of the database. Thus, the storage areas associated with the index tables for database applications would be considered hot spots, and it would be desirable to maintain this data in cache. However, for storage I/O, hot spot references are usually interspersed with enough references to non-hot spot data such that conventional cache replacement algorithms, such as LRU algorithms, do not maintain the hot spot data in cache long enough to be re-referenced. Because conventional caching algorithms used by RAID controllers do not attempt to identify hot spots, these algorithms are not effective for producing a large number of cache hits.

SUMMARY

In accordance with teachings of the present disclosure, a system and method for replacing cached data retrieved from one or more storage devices in a computer system is disclosed that provide significant advantages over prior developed systems.

The storage devices are divided into a plurality of areas or bins. Each bin is preferably the same size. A Bin Access Table (BAT) is an array stored in memory that contains a frequency value for each bin corresponding to the number of times that the bin has been accessed during a predetermined time period. The BAT also contains a time stamp for each bin corresponding to the time that the bin was last accessed. A hot spot algorithm is used to calculate a hot spot factor or value hsf(x) for each bin based on its associated frequency value listed in the BAT. The frequency values may be weighted based on the time the bin was last accessed. Each line in cache will therefore correspond to a specific bin for which a time weighted hotspot factor hsf(x) has been calculated. These time weighted hot spot values may be stored in a hot spot table. The hot spot table may be a separate table or stored in the BAT.

When data is retrieved from a storage in response to a cache miss, a memory controller, such as a processor or RAID controller, will compare the hotspot factor hsf(a) of the bin associated with the new data to the lowest time weighted hotspot factor hsf(z) in the hot spot table. If the time weighted hsf(z) is greater than hsf(a), then this indicates that bin (z), the bin with the lowest time weighted hotspot factor, is accessed more frequently than bin (a), the bin containing the retrieved data. Thus if the time weighted hsf(z) is greater than hsf(a), then the cache line containing data from bin (z) will not be replaced. If hsf(a) is greater than the time weighted hsf(z) then the new data will replace the cached data from bin (z). The BAT table is updated after the I/O access.

A technical advantage of the present invention is that the cache replacement algorithm is based on frequency of use and is able to track hotspot data longer than least recently used algorithms or similar cache replacement methods. In addition, because the present invention uses time weighted hot spot factors, it is possible to replace cached data that has become stale and still retain cached data that has the potential for frequent cache hits over a selected period of time. As a result, the present invention is well suited for applications that exhibit from low levels of locality, such as applications utilizing several large storage devices. Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a diagram illustrating an embodiment of a Bin Access Table of the present invention;

FIGS. 5a and 5b are diagrams illustrating an example of updating the BAT;

DETAILED DESCRIPTION

Figure 2:
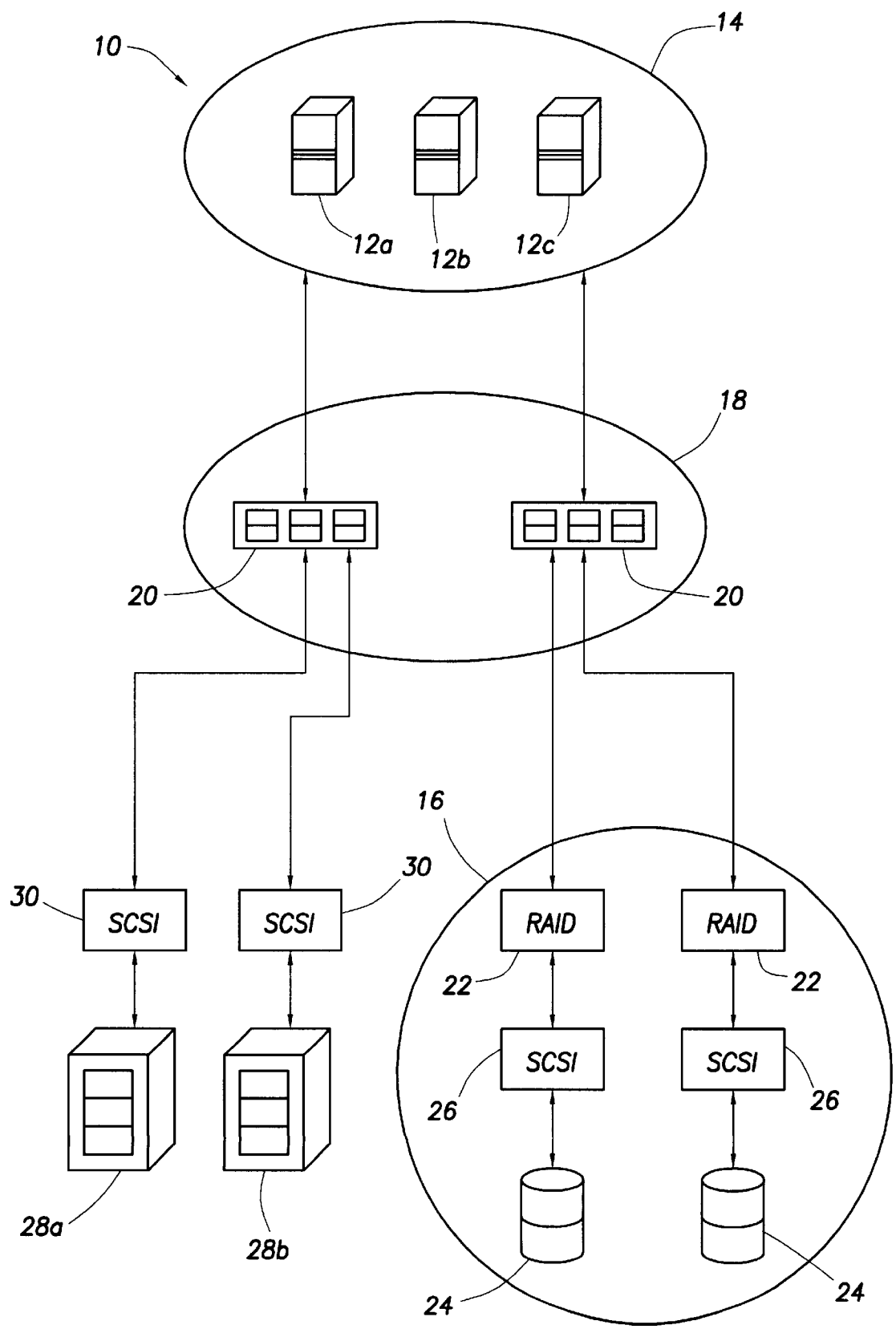
FIG. 2 is a diagram of a computer network.

FIG. 2 is a diagram of a computer system or network. A shared storage network, indicated generally at 10, includes a plurality of servers 12a, 12b, and 12c, which form part of computer network 14. Servers 12 can include UNIX-based servers, WINDOWS NT-based servers, NETWARE servers, thin server computers, and other server systems. Computer network 14 can include, for example, a local area network (LAN), a wide area network (WAN), or other computer network allowing transmission of data between computing devices. Servers 12 may employ a variety of network protocols for the transfer of data, including TCP/IP. The number of servers may vary from the number shown in FIG. 2 and described in this disclosure.

Shared storage network 10 includes several storage subsystems 16. Servers 12 within computer network 14 can transfer data between other servers 12 as well as to and from the storage subsystems 16. The storage subsystems 16 provides a large amount of storage space and can be operated as the consolidated storage for computer network 14. The storage subsystems 16 are coupled to computer network 14 via Fiber Channel fabric or switching fabric 18. The Fiber Channel fabric 18 is composed of several Fiber Channel switches 20 that allow various electronic interconnections between the various devices that compose shared storage network 10. The Fiber Channel fabric 18 and the storage subsystems 16 comprise a storage area network (SAN). The storage subsystems 16 includes a storage controller 22 that is coupled to a plurality of physical storage devices 24, collectively known as a storage pool. The storage pool may be connected to the storage controller by a number of protocols, including but not limited to SCSI, Fiber Channel and ATA/IDE. Storage devices 24 may be any devices suitable for storing data, such as a collection of hard disk drives or other integrated non-volatile memory. If storage device 24 is a SCSI device, then shared storage network 10 may include a SCSI bridge 26. SCSI bridge 26 is a communications device that allows a SCSI device to communicate electronically with devices employing Fiber Channel protocol. For example, SCSI bridge 26 may be a SCSI/FC bridge. SCSI bridge 26 may be incorporated into another device, such as Fiber Channel switches 20 or storage controllers 22, or may be a separate component.

Storage controller 22 coordinates access to storage devices 24. The storage controller is preferably a RAID (Redundant Array of Independent Disks) controller. While the following disclosure describes the present invention being implemented with a RAID controller, the present invention may be implemented with any memory controller. Thus, the following invention may be implemented with a processor in addition to a storage controller such as a RAID controller. The memory controller comprises logic operable to manipulate or maintain a cache. The cache may be integral to the memory controller. Storage devices 24 are grouped into RAID volumes and each volume is assigned a SCSI logical unit number (LUN) address. In this configuration, SAN 16 can use SCSI addressing methods to store and retrieve data from storage devices 24. SAN 16 can include fewer or more storage devices 24 than depicted in FIG. 2. Shared storage network 10 may further include dedicated backup storage devices 28. If the backup storage devices 28 are SCSI devices, they may be coupled to Fiber Channel fabric 18 via SCSI bridges 30. Dedicated backup storage devices 28 can include, for example, computing devices having removable storage such as a tape medium or any other computer readable medium conventionally used for backup storage.

Each logical volume of storage may be divided into n areas or bins. Each bin is preferably the same size. Thus, for a logical volume that contains logical block addresses 0 to b, each bin may correspond to b/n logical block addresses.

Figure 3A:
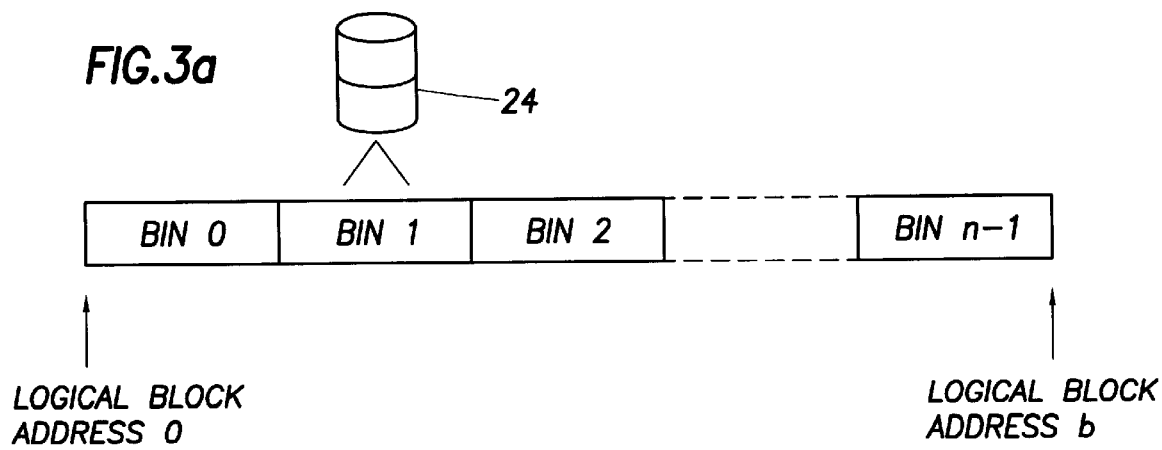
FIG. 3 is a diagram illustrating an embodiment of a bin of the present invention.
Figure 3B:
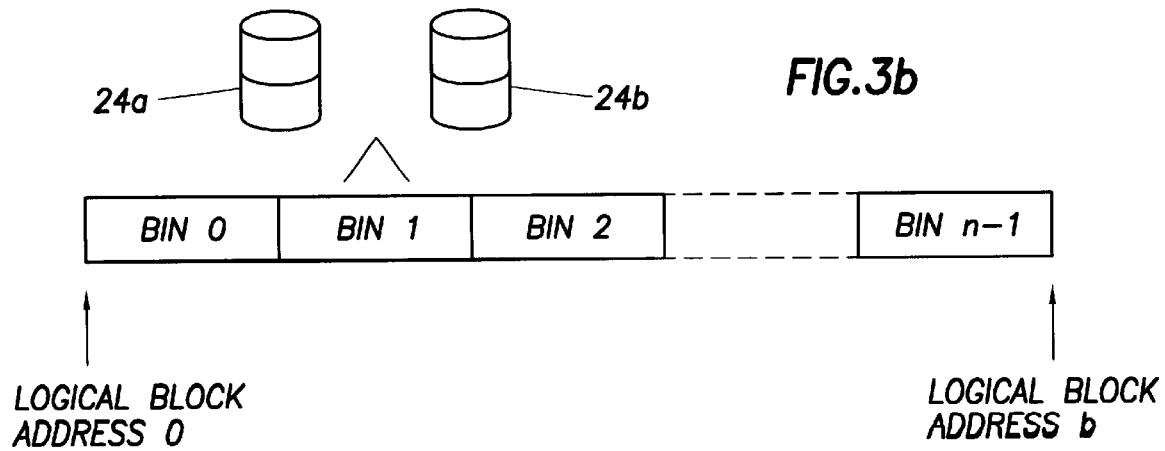

As shown in FIG. 3a, if a logical volume of storage corresponds to a single storage device or disk 24, then the storage volume associated with that storage device 24 may be divided into n bins. Alternatively, a logical volume of storage may correspond to the storage volume of several storage devices 24, or to selected sections of the storage volumes of several storage devices 24. In this case, as shown in FIG. 3b, the storage volumes of several storage devices 24 may be divided into n bins. Note that the following discussion and examples assume that the memory controller, such as a RAID controller, is only controlling one logical volume. The system and method of the present invention is also suitable for cases in which the memory controller controls multiple logical volumes.

The frequency with which a given bin is accessed over a period of time may be stored in an array. FIG. 4 shows an embodiment of a bin access table (BAT), which is an array that stores the access history for each bin in a logical volume. The first column of the BAT is an index into the array based on bin number. The second column contains a frequency value $f_x$ corresponding to the number of times a particular bin (x) has been accessed from an initial time to the current time. The time period may be selected by the system administrator and modified during the configuration of the memory controller. For example, this time period may correspond to an hour, or it may be configured such that $f_x$ corresponds to the number of times the bin (x) has been accessed from the beginning of the day or even from the time the associated storage device was first coupled to the computer network. The optimum time period may be selected by the system administrator based on experimentation, simulation or testing. The third column contains a time stamp corresponding to the time $t_x$ the bin (x) was last accessed. The time stamp is preferably based on the time clock used by the computer network. Bins that were accessed recently will have a time stamp close to the current time, while bins that have not been recently accessed will have an older time stamp. A bin that has a high access frequency value $f_x$ and a current time stamp $t_x$ is the more likely to be an active hot spot. On the other hand, and old time stamp for a bin that has a high access frequency value generally indicates that the bin is no longer a hot spot. Thus, the combination of the time stamp $t_x$ and frequency value $f_x$ indicates whether a particular bin (x) is still a hot spot. Accordingly, if the time stamp is too old, then the frequency value for the associated bin may be zeroed. Thus, if $(t-t_x)$ becomes too great, then the frequency value for the bin may be changed to zero. The reset time period after which a frequency value is changed to zero may be determined by the system administrator during the configuration of the memory controller, for example. As with other parameters, the optimum value for this reset time period may depend on the type of applications that are stored in the bin, among other factors, and may determined by experimentation, testing or simulation.

The memory controller may allocate the BAT in its local memory or cache. Alternatively, the BAT may be located in memory other than the cache. For example, the BAT may be stored in a memory corresponding to another device coupled to the computer network. The size of the bins is typically inversely related to size of the BAT. As more rows of the BAT are allocated in memory, the bin size may be made smaller. For example, if the memory controller has a BAT size of 100 rows and the total size of the storage it controls is 100 GB, then each bin may correspond to 1 GB. As the bin size decreases, the cache hit ratio of the presently disclosed caching algorithm may increase. Therefore, it is preferable to minimize the size of the bins. If the memory controller handles more than one logical volume, several BATs may be used, one for each logical volume for example, or one BAT for all of the logical volumes. Alternatively, only selected logical volumes may have an associated BAT.

FIGS. 5a and 5b depict how the contents of the BAT table are updated over time. FIG. 5a shows a BAT table at time t=29. In this example, the BAT table contains frequency values for three bins, bin (0) through bin (2). As discussed above, the frequency value correspond to the number of times an I/O access was directed to a given bin from an initial time t=0 up to time t=29. For example, by time t=29, bin (0) was accessed 10 times, bin (1) was accessed 20 times and bin (2) was accessed 5 times. Bin (0) was last accessed at time t=20, bin (1) was last accessed at time t=25, and bin (2) was last accessed at time t=10. Thus, bin (1) was accessed most recently and most frequently of the three bins. Bin (2) is the least recently accessed bin of the three bins. FIG. 5b shows the BAT table at time t=30. The BAT shows that an I/O access was directed to data that was contained in bin (0) at time t=30. Accordingly, the frequency value $f_0$ and the time stamp to for bin (0) is updated. In this case, the values in the BAT corresponding to the other bins remain unchanged because the other bins were not accessed at time t=30.

Figure 6:
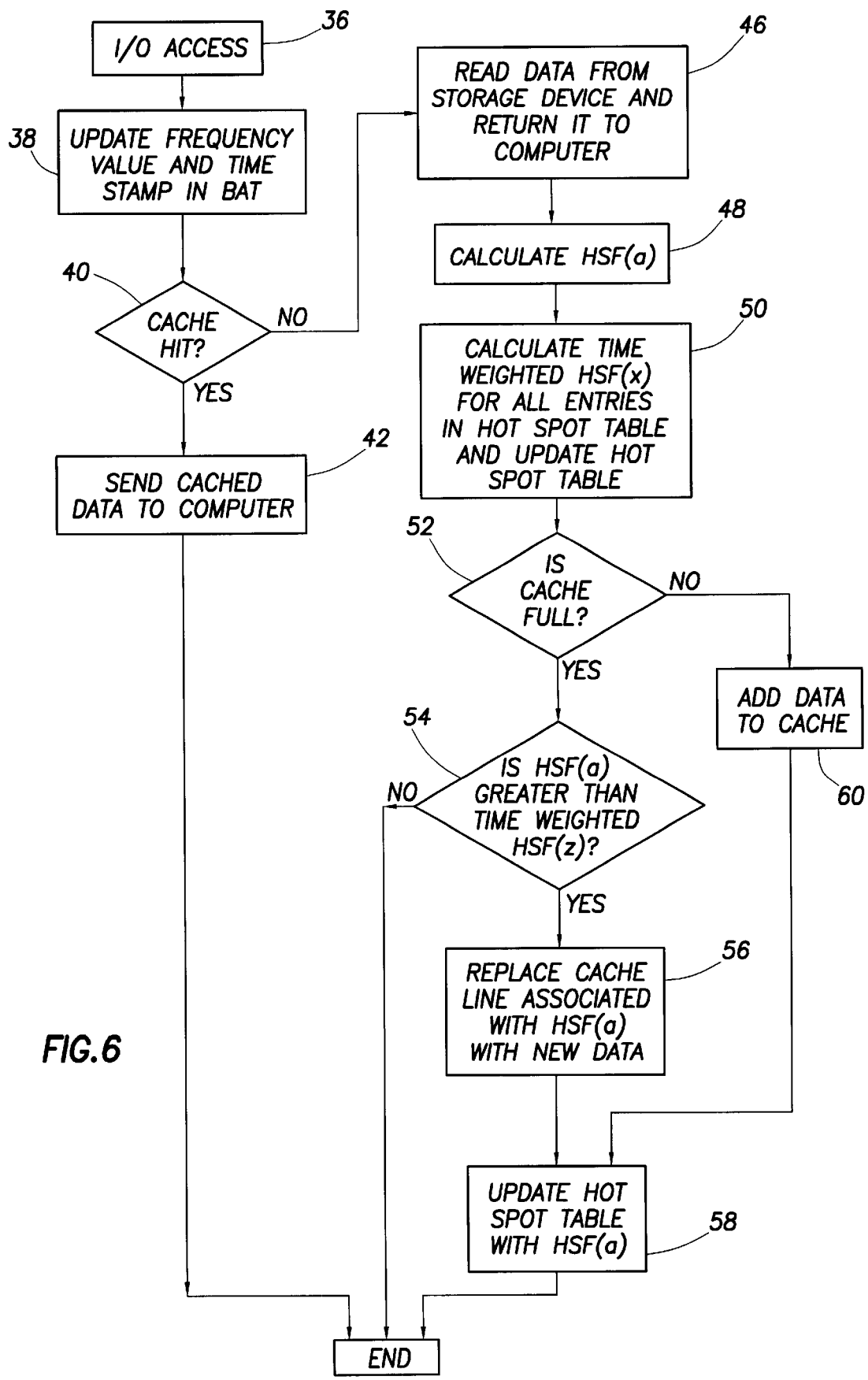
FIG. 6 is a flow diagram illustrating an embodiment of the present invention.

FIG. 6 is a flow diagram illustrating an embodiment of the system and method of the present invention. At step 36, an I/O access occurs. The I/O access may be either a read or write access. An I/O access occurs when a computer system or server 12 accesses a storage device 24 or logical volume of storage. As discussed above, each logical volume of storage may be divided into n equal areas or bins. Thus, the data sought by the I/O access will reside in a particular bin (x) in the logical volume. For the purposes of this discussion, bin(a) is the bin that contains the data sought by the present I/O access. At step 38, the BAT is updated to reflect the I/O access. As discussed above, the frequency value $f_a$ associated with bin (a) are increased with each I/O access directed to that bin. Thus, the frequency value stored in the BAT for bin (a) is incremented by one to reflect the I/O access. In addition, the time stamp $t_a$ from bin (a) is changed to reflect the current time t, the time at which the I/O access occurred.

At step 40, the memory controller or other computer system or computer network device determines whether or not the data sought by the I/O access is present in cache. If a cache hit occurs, then the cached data is returned to the computer application in step 42. As discussed above, over a period of time, certain areas of storage are accessed more often than other areas. These areas of storage that are more frequently accessed are termed hot spots. The hot spot factor hsf(x) is a value corresponding to how frequently a given bin (x) is accessed. The hot spot factor hsf(x) for a bin (x) that holds data that is responsive to a current I/O access may be represented by the following formula:

$$hsf(x)=f_x \qquad \text{Equation (1)}$$

where $f_x$ is the frequency entry from the BAT for bin (x). Alternatively, the hot spot factor hsf(x) may be expressed as any formula that is proportional to the frequency value $f_x$ for the bin (x). For example, the hot spot factor hsf(x) may weight particular bins because the system administrator may wish to give a caching preference to certain bins. For instance, certain bins may be weighted based on the particular type of data or application that is stored in the bin, network or hardware considerations, or other factors. In this case, the hot spot factor hsf(x) may be expressed as:

$$hsf(x)=\phi_x f_x \qquad \text{Equation (2)}$$

where $\phi_x$ is the scaling factor for bin (x). The optimum values for the scaling factors, as well as other parameters that may be adopted with the hot spot factor hsf(x), may be determined from testing, simulation or experimentation. These values may vary based on the size of the storage, the types of applications that are located in storage, and other such factors. The values of the scaling coefficients and other parameters may be modified during the configuration of the storage or memory controller by the administrator of the system. For example, the parameters may be optimized for specific applications or may be selected for overall performance in a wide variety of applications.

Figure 1:
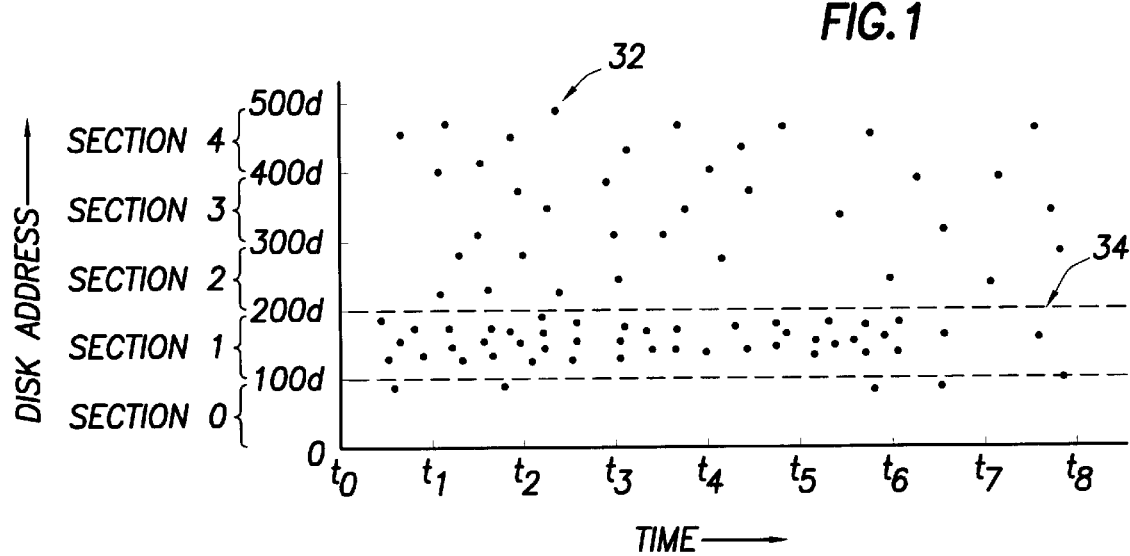
FIG. 1 is a diagram illustrating a hot spot.

Note that the hot spot factor hsf(x) shown in Equation (1) is not time-weighted. As discussed above, a bin is typically a hot spot for only a finite period of time. As time goes on, the access frequency will drop and the bin will no longer be considered a hot spot. For example, the hot spot in section 1 shown in FIG. 1 is present only from time $t_0$ to $t_6$. Accordingly, the frequency values for bins that have not been accessed recently may be considered less relevant than bins that have been accessed more recently in determining whether data should remain in cache or be replaced. Therefore, the hot spot factors hsf(x) for the bins that contain data stored in cache should be time weighted before being compared to the hot spot factor for the bin corresponding to the current I/O access. Because the time stamp value $t_x$ corresponds to the time the associated bin was last accessed, the hot spot factors hsf(x) may be time weighted based on the time stamps $t_x$ from the BAT. Accordingly, the time weighted hot spot factors hsf(x) may be expressed as:

$$\text{time weighted } hsf(x)=f_x \beta[1/(t-t_x)] \qquad \text{Equation (3)}$$

where t is the current time and $\beta$ is a scaling factor that adjusts the weight of the time stamp. The optimum value for the scaling factor, as well as other parameters, may be determined from testing, simulation or experimentation. For example, if the system administrator wishes to configure the memory controller so that it replaces cache more readily, the value for $\beta$ can be set to a smaller value.

The time weighted hsf(x) values for each bin that contains data that is currently stored in cache may be stored in a hot spot table. The hot spot table may be any array or table that can be searched. For example, the hot spot table may be implemented as a hash table. The hot spot table may be stored in the BAT or it may be a separate table. The hot spot table may be stored in the cache or it may be stored in other memory. For example, the hot spot table may be stored in a memory corresponding to another device coupled to the computer network. Once the cached data has been retrieved in step 42, the hot spot factors hsf(x) are re-calculated and the hot spot table is updated to reflect the current hsf(x) values in step 44. As discussed above, the hsf(x) value for bin(a), the bin that contains data responsive to the present I/O access, is calculated according to Equation (1) and the other values in the hot spot table are time weighted according to Equation (3). Note that the time weighted hsf(x) values for the bins that are not accessed decreases with time.

Figure 7:
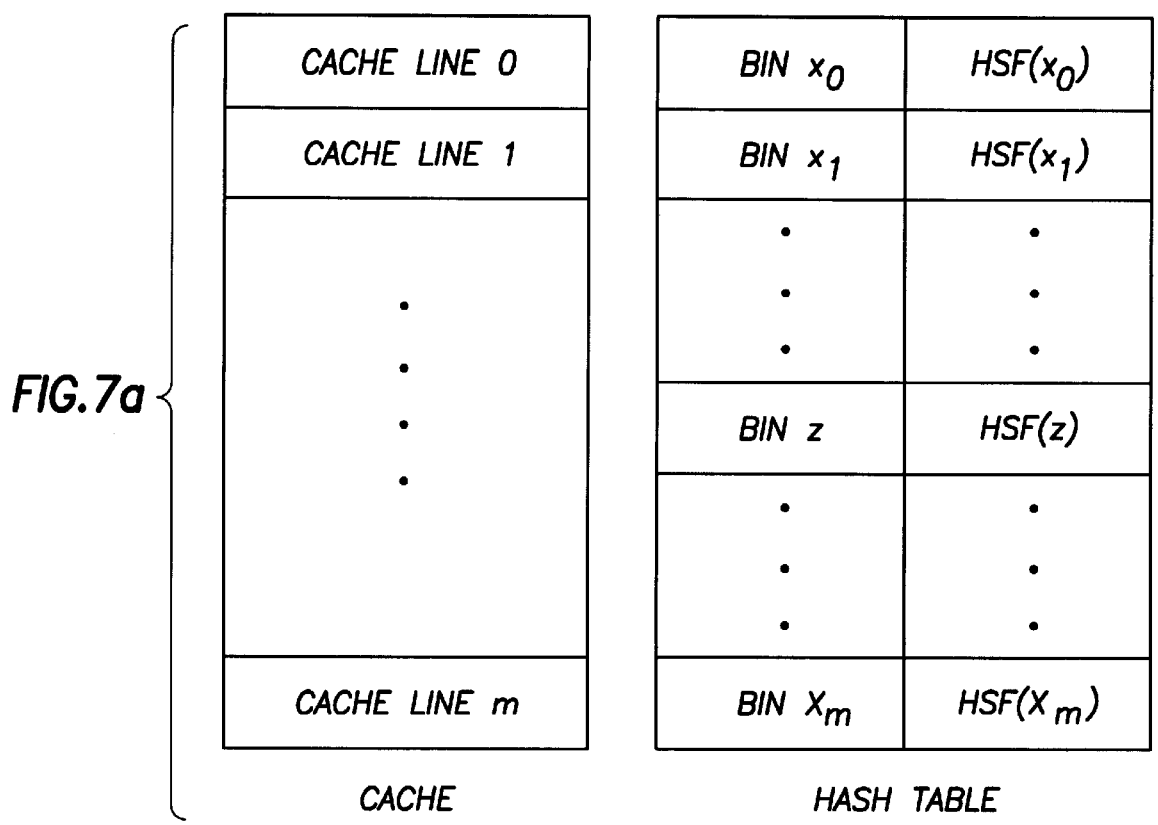
FIGS. 7a, 7b and 7c are diagrams illustrating an embodiment of a hot spot table.

FIG. 7a illustrates one embodiment of the hot spot table. The hot spot table has m rows, where m is the number of cache lines in the memory controller cache. Each row in the hot spot table corresponds to the associated line in cache. For example, the first row of the hot spot table corresponds to the first cache line of the cache. Each row in the hot spot table stores the hot spot value hsf(x) of the bin (x) that contains the data that is stored in the cache line associated with that row. For bins that have not been accessed at the current time, the hot spot value hsf(x) is calculated according to Equation (3) and the hot spot value hsf(x) for the bin that is currently being accessed by the present I/O access, bin (a), is calculated according to Equation (1). Thus, the first row of the hot spot table corresponds to bin $x_0$, the bin that contains the data currently stored in cache line 0, and this first row contains the hot spot value hsf($x_0$) for that bin. Bin (z) is the bin with the lowest hot spot factor in the hot spot table. In other words, bin (z) has the lowest hot spot factor of all the bins that contain data that is currently located in cache. The hot spot table may be sorted according to value.

If a cache miss occurs instead of a cache hit, the data sought by the I/O access is read from the bin, designated bin (a), that contains this data in step 46. This data is then returned to the computer application. In step 48, the hot spot value for bin (a) is calculated according to Equation (1). Next, the time weighted hsf(x) values in the hot spot table are re-calculated according to Equation (3) in step 50. These calculations include the time weighted hsf(z) for bin (z), the bin with data currently in cache that has the lowest hot spot factor. At step 52, the memory controller determines whether or not the cache is full. Because cache space is limited, it is necessary to determine how data that is already present in the cache lines is to be replaced by data that is retrieved in response to a cache miss. As discussed above, by determining the hot spot factor for each bin, cached data may be replaced by newly retrieved data based on the frequency with which a given bin was accessed over time.

If the cache is full, then at step 54, the hot spot factor for the bin corresponding to the I/O access, hsf(a), is compared to hsf(z), the time weighted hot spot factor for bin (z), the bin with data currently in cache that has the lowest hot spot factor. Because bin (z) has the lowest hot spot factor, this bin is the least likely of the bins with data currently in cache to contain data that will be required by future I/O accesses. However, the data from bin (z) that is currently in cache may still be more likely to produce a cache hit in response to future I/O accesses than the data from bin (a) that was responsive to the current I/O access. Therefore, it is necessary to compare hsf(a) to the time weighted hsf(z) to make this determination. The memory controller may comprise logic operable to calculate and compare hot spot factors. Alternatively, other computer system components may be used to calculate and compare the hot spot factors.

If the time weighted hsf(z) is greater than hsf(a), then the data from bin (z) that is currently in cache is more likely to produce a cache hit in response to the next I/O access than the data from bin (a) that was responsive to the current I/O access. The data from bin (z) that is currently in cache may not necessarily be the actual data required by the next I/O access because the size of a bin is generally greater than the size of a cache line. However, it is more likely that this data will be required because bin (z) has a greater hot spot factor. As discussed above, because bin (z) has a greater hotspot factor, the data present in bin (z) is accessed more frequently than the data in bin (a). Thus, the hotspot factor indicates that it is more probable that the next I/O access will require data from bin (z) than from bin (a). Note that the number of cache hits will increase as the storage volumes are divided into more bins. Accordingly, as the bin size decreases to approach the size of a cache line, the accuracy of the caching algorithm increases (i.e. the level of granularity increases).

Therefore, if the time weighted hsf(z) is greater than hsf(a), the data from bin (a) that was responsive to the current I/O access will not be placed in cache. On the other hand, if hsf(a) is greater than the time weighted hsf(z), then the data from bin (z) that is currently in cache is less likely to produce a cache hit in response to future I/O accesses than the data from bin (a) that was responsive to the current I/O access. Therefore, if hsf(a) is greater than hsf(z), the data from bin (a) that was responsive to the current I/O access will replace the data from bin z in cache in step 56.

Next, in step 58, the hot spot table is updated to reflect the replacement. If hsf(z) equals hsf(a), then the storage or RAID controller may either replace the cache line associated with bin (z) with the data from bin (a) or retain the data in cache. If hsf(a) is not greater than the time weighted hsf(z), then the cache line associated with hsf(z) is not replaced. For example, FIG. 7b shows the hot spot table at time t=30, before being updated. The hot spot table reflects the status of the cache at time t=30, before the cache is updated. In this case, the cache has two lines, the first line contains data from bin (1) and the second line contains data from bin (2). Therefore, the hot spot table contains the time weighted hot spot factors for these two bins hsf(1) and hsf(2) at time t=30. Using the values from FIG. 5b and Equation 3 for hsf(x), and setting β=1 for this example, the hot spot factors may be calculated as:

Time t=30, before cache and hot spot table updated

Bin 1: hsf(1)=20(1)[1/(30−25)]=4

Bin 2: hsf(2)=5(1)[1/(30−10)]=0.25

The hot spot table therefore contains the values 4 and 0.25 in the first and second rows, respectively. In this case, bin (2) has the lowest time weighted hot spot fact hsf(x) in the hot spot table. At time t=30, an I/O access corresponding to bin (0) is made. To determine the hot spot factor for bin (0), the hot spot factor is calculated using Equation (1), because bin(0) contains data that is responsive to the current I/O access. Using the values from FIG. 6b and Equation 1 for hsf(x), the hot spot factor for bin (0) may be calculated as:

$$Bin(0) \text{ at } t=30 : hsf(0) = f_0 = 11.$$

Thus, the memory controller determines that the hot spot value for bin (0) at time t=30 is 11. This value is then compared to the lowest hot spot value in the hot spot table. Because this value exceeds 0.25, the data from bin (0) replaces the data from bin (2) in the cache. The hot spot table is accordingly updated as shown in FIG. 7c. If, on the other hand, the cache is not full, then the data from bin (a) may be added to cache in step 60. The hot spot table is then accordingly updated to reflect this addition in step 58. After the hot spot factor hsf(a) has been added to the hot spot table, the memory controller is then ready for the next I/O access.

Figure 8:
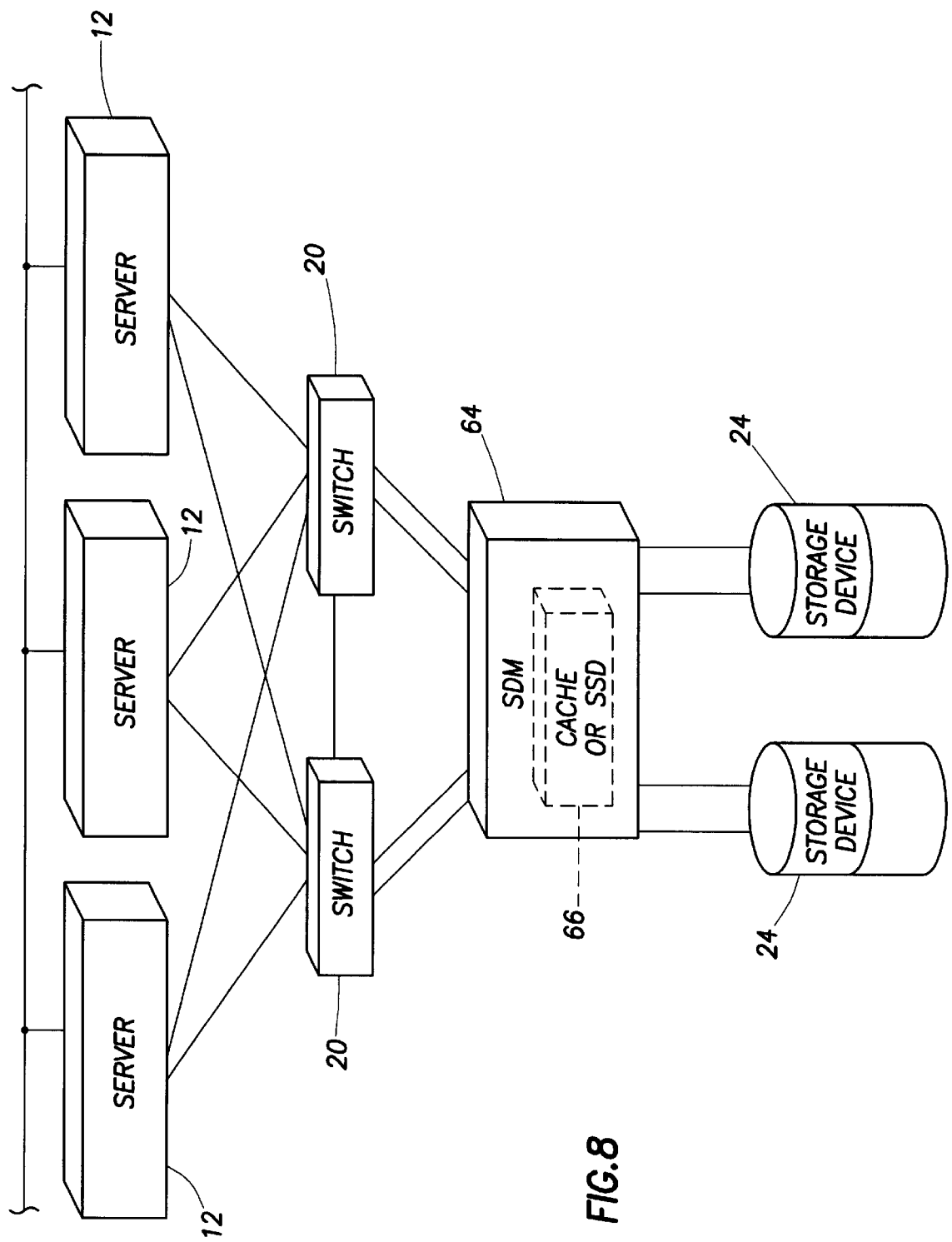
FIG. 8 is a diagram of a computer network

The present invention is not limited to memory controllers. The present invention may be implemented by any computer system or network device that is operable to manipulate or maintain a cache. For instance, the present invention may be used by storage virtualizers such as storage domain managers or other network or SAN appliances that handle block level I/O and maintain a cache. For example, the storage domain manager (SDM) is a network appliance that contains a cache and is typically used in SAN applications to monitor I/O activity and performs routing functions. FIG. 8 shows a network configuration with an SDM 64. The SDM performs several functions. It allows storage subsystems from different vendors to be attached below the SDM. The SDM hides the storage type from the servers and presents the servers with only one type of storage. Because the SDM can communicate with different types of storage, the servers are freed from having to support multiple storage systems. This functionality may be called heterogeneous storage attachment. The SDM is also a central point of management for all storage. It provides LUN mapping and LUN masking. It also allows data to be mirrored between storage subsystems. Furthermore, the SDM also allows several storage subsystems to be logically combined in to one large storage volume. The SDM also has a caching capability to increase the performance of all storage subsystems and may accordingly use the present invention. Furthermore, the present invention is not limited to manipulating a cache. For example, the present invention may be used for solid state disks or solid state memory. For instance, the SDM has the option for adding SSD hardware 66 inside its chassis. The SDM may be configured to use the SSD as a caching unit. Therefore, the present invention may be applied to cache block level data on the SSD instead of the traditional cache memory.

Because the cache replacement algorithm of the present invention is based on frequency of use it is able to track hotspot data longer than least recently used algorithms or other conventional cache replacement methods. Thus, the present invention is able to improve cache hit performance for applications that exhibit low levels of locality, such as applications utilizing several large storage devices. The present invention optimizes cache content because it eliminates stale data from cache while retaining cached data that has the potential to produce cache hits over a selected period of time.

Although the disclosed embodiments have been described in detail, it should be understood that various changes, substitutions, and alterations can be made to the embodiments without departing from the spirit and the scope of the invention.

What is claimed is:

1. A computer network comprising:
   one or more storage devices, wherein the storage devices comprise a plurality of logical volumes, and wherein each logical volume comprises one or more bins, such that each bin corresponds to an area of a storage device;
   a first and second memory location;
   a cache, wherein the cache comprises one or more lines of cache operable to store data;
   a bin access table located in the first memory location, wherein the bin access table contains a frequency value and a time stamp for each bin, wherein the frequency value corresponds to the number of times an I/O access was directed to data stored in that bin and the time stamp corresponds to the time of the most recent I/O access that was directed to data stored in that bin;
   a hot spot table located in the second memory location, wherein the hot spot table contains a hot spot value for each bin that contains data stored in a cache line, wherein the hot spot value corresponds to the frequency value and time stamp contained in the bin access table for that bin; and
   a logic operable to calculate a hot spot value and make a comparison of the hot spot value for a bin that contains data responsive to an I/O access to one or more hot spot values stored in the hot spot table; and
   a network appliance operable to replace data stored in a cache line based on the comparison.

2. The computer system of claim 1, wherein the network appliance is a memory controller.

3. The computer system of claim 2, wherein the memory controller is a storage controller.

4. The computer system of claim 1, wherein the network appliance is a storage virtualizer.

5. The computer system of claim 1, wherein the first and second memory locations are located in the cache.

6. The computer system of claim 1, wherein the network appliance comprises the cache.

7. The computer system of claim 1, wherein the hot spot factor of the bin that contains data responsive to a current I/O access is expressed as: $hsf(x)=f_x$, and the hot spot factor for a bin that does not contain data responsive to the current I/O access is expressed as $hsf(x)=f_x\beta[1/(t-t_x)]$, wherein $f_x$ is the frequency value contained in the bin access table for bin x, t is the current time, $t_x$ is the time stamp value contained in the bin access table, and $\beta$ is a predetermined scaling factor.

8. The computer system of claim 1, wherein the network appliance comprises the logic.

9. A computer network comprising:
   one or more storage devices, wherein the storage devices comprise a plurality of logical volumes, and wherein each logical volume comprises one or more bins, such that each bin corresponds to an area of a storage device;
   a cache, wherein the cache comprises one or more lines of cache operable to store data;
   a bin access table located in the first memory location, wherein the bin access table contains a frequency value and a time stamp for each bin, wherein the frequency value corresponds to the number of times an I/O access was directed to data stored in that bin and the time stamp corresponds to the time of the most recent I/O access that was directed to data stored in that bin;
   a hot spot table stored in cache, wherein the hot spot table comprises one or more entries corresponding to a line of cache, wherein each entry contains a hot spot value $hsf(x)$ for the bin that contains data that is currently stored in the corresponding line of cache, wherein the hot spot factor of a bin that does not contain data responsive to the current I/O access is expressed as is expressed as: $hsf(x)=f_x\beta[1/(t-t_x)]$, wherein $f_x$ is the frequency value contained in the bin access table for bin x, t is the current time, $t_x$ is the time stamp value contained in the bin access table, and $\beta$ is a predetermined scaling factor, and wherein $hsf(z)$ is the hot spot factor for bin (z) and is the lowest hot spot factor in the hot spot table; and
   a memory controller operable to compare $hsf(a)$ to $hsf(z)$ upon receiving an I/O access, wherein $hsf(a)$ is the frequency value for bin (a) and wherein bin (a) is the bin that contains data responsive to the I/O access, and replace the data from bin (z) that is in cache with the data from bin (a) if $hsf(a)$ is greater than $hsf(z)$ and the cache is full.

10. The computer system of claim 9, wherein the memory controller is a storage controller.

11. The computer system of claim 10, wherein the memory controller is a RAID controller.

12. The computer system of claim 9, wherein the memory controller comprises the cache.

13. The computer system of claim 9, wherein the bin access table comprises the hot spot table.

14. The computer system of claim 9, wherein each bin is of equal volume.

15. The computer system of claim 9, wherein the computer system comprises a shared storage network.

16. A method for caching data retrieved from one or more storage devices coupled to a computer network, wherein the storage devices comprise a plurality of bins, such that each bin corresponds to an area of a storage device, comprising the steps of:

providing a cache, wherein the cache comprises one or more lines of cache operable to store data;

providing a first and second memory location;

providing a bin access table located in the first memory location, wherein the window access table contains frequency values for each bin corresponding to the number of times an I/O access was directed to data stored in that bin, and time stamp values for each bin corresponding to the time of the most recent I/O access that was directed to data stored in that bin;

providing a hot spot table located in the second memory location, wherein the hot spot table contains a hot spot value corresponding to the frequency value and time stamp value contained in the bin access table for bins that contain data stored in a cache line; and providing a logic operable to calculate a hot spot value and make a comparison of the hot spot value for a bin that contains data responsive to an I/O access to one or more hot spot values stored in the hot spot table; and providing a network appliance operable to replace data stored in a cache line based on the comparison;

receiving an I/O access directed to data stored in a first bin;

calculating the hot spot factor of the first bin;

comparing the hot spot factor of the first bin to one or more hot spot factors in the hot spot table; and determining which line of cache, if any, to replace with data responsive to the I/O access based on the comparison.

17. The method of claim 16, wherein the network appliance is a memory controller.

18. The method of claim 17, wherein the memory controller is a storage controller.

19. The method of claim 16, wherein the network appliance is a storage virtualizer.

20. The method of claim 16, wherein the first and second memory locations are located in the cache.

21. The method of claim 16, wherein the network appliance comprises the cache.

22. The method of claim 16, wherein the hot spot factor of the bin that contains data responsive to a current I/O access is expressed as: $hsf(x)=f_x$, and the hot spot factor for a bin that does not contain data responsive to the current I/O access is expressed as $hsf(x)=f_x\beta[1/(t-t_x)]$, wherein $f_x$ is the frequency value contained in the bin access table for bin x, t is the current time, $t_x$ is the time stamp value contained in the bin access table, and $\beta$ is a predetermined scaling factor.

23. The method of claim 16, wherein the network appliance comprises the logic.

24. A method for caching data retrieved from one or more storage devices coupled to a computer network, wherein the storage devices comprise a plurality of logical volumes, and wherein the logical volumes are apportioned to a plurality of bins, such that each bin corresponds to an area of a storage device, comprising the steps of:

providing a memory controller;

providing a cache, wherein the cache comprises one or more lines of cache operable to store data;

providing a bin access table located in the first memory location, wherein the bin access table contains a frequency value and a time stamp for each bin, wherein the frequency value corresponds to the number of times an I/O access was directed to data stored in that bin and the time stamp corresponds to the time of the most recent I/O access that was directed to data stored in that bin;

providing a hot spot table stored in cache, wherein the hot spot table comprises one or more entries corresponding to a line of cache, wherein each entry contains a hot spot value hsf(x) for the bin that contains data that is currently stored in the corresponding line of cache, wherein the hot spot factor for a bin that does not contain data responsive to a current I/O access is expressed as: $hsf(x)=f_x\beta[1/(t-t_x)]$, wherein $f_x$ is the frequency value contained in the bin access table for bin x, t is the current time, $t_x$ is the time stamp value contained in the bin access table, and $\beta$ is a predetermined scaling factor;

receiving an I/O access directed to data stored in a first bin from an application;

updating the frequency value in the window access table corresponding to the current time window for the first bin;

determining whether or not a cache hit or a cache miss has occurred;

sending the cached data to the application if a cache hit occurs;

recalculating the hot spot factors for the bins that contain data that is currently stored in cache and updating the hot spot table with the recalculated hot spot factors if a cache hit occurs;

reading data from an area of a storage device corresponding to the first bin and sending the data from the first bin to the application if a cache miss occurs;

calculating the hot spot factor for the first bin, wherein the hot spot factor for the first bin is equal to the frequency value corresponding to the first bin, adding the data from the first bin to cache and updating the hot spot table with an entry corresponding to the hotspot factor for the first bin for the associated line of cache, if a cache miss occurs and the cache is not full; and comparing the hot spot factor for the first bin to the hot spot factor for a second bin, wherein the second bin is the bin with the lowest associated hot spot factor in the hot spot table, and replacing the data associated with the second bin in cache line with the data from the second bin, and updating the hot spot table with the hot spot value for the first bin in the entry associated with the cache line that previously contained data from the second bin if the hot spot factor for first bin is greater than the hot spot factor for the second bin, a cache miss occurs and the cache is full.

25. The method of claim 24, further comprising the step of:

replacing the data associated with the second bin in cache line with the data from the first bin, and updating the hot spot table with the hot spot value for the first bin in the entry associated with the cache line that previously contained data from the second bin if the hot spot factor for the first bin is equal to the hot spot factor for the second bin, a cache miss occurs and the cache is full.

26. The method of claim 24, wherein the memory controller is a storage controller.

27. The method of claim 26, wherein the memory controller is a RAID controller.

28. The method of claim 24, wherein the memory controller comprises the cache.

29. The method of claim 24, wherein the bin access table comprises the hot spot table.

30. The method of claim 24, wherein each bin is of equal volume.

31. The computer system of claim 24, wherein the computer system comprises a shared storage network.

32. A network appliance operable to be coupled to a computer network comprising one or more storage devices wherein the storage devices comprise a plurality of bins, such that each bin corresponds to an area of a storage device, comprising:

> a cache, wherein the cache comprises
>> one or more lines of cache operable to store data,
>> a bin access table located in the first memory location, wherein the bin access table contains a frequency value and a time stamp for each bin, wherein the frequency value corresponds to the number of times an I/O access was directed to data stored in that bin and the time stamp corresponds to the time of the most recent I/O access that was directed to data stored in that bin;
>
> a hot spot table located in the second memory location, wherein the hot spot table contains a hot spot value corresponding to the frequency value and time stamp value contained in the bin access table for bins that contain data stored in a cache line; and
>
> a logic operable to calculate a hot spot value and make a comparison of the hot spot value for a bin that contains data responsive to an I/O access to one or more hot spot values stored in the hot spot table.

33. The network controller of claim 32, wherein the network controller is a memory controller.

34. The memory controller of claim 33, wherein the memory controller is a storage controller.

35. The memory controller of claim 34, wherein the memory controller is a RAID controller.

36. The network appliance of claim 32, wherein the network appliance is a storage virtualizer.

37. The network appliance of claim 32, wherein the network appliance is processor.

\* \* \* \* \*